(12) United States Patent
Hong et al.

(10) Patent No.: US 8,685,882 B2
(45) Date of Patent: Apr. 1, 2014

(54) VANADIUM/TITANIA CATALYST COMPRISING NATURAL MANGANESE ORE FOR REMOVING NITROGEN OXIDES AND DIOXIN IN WIDE OPERATING TEMPERATURE RANGE AND METHOD OF USING THE SAME

(71) Applicant: Korea Power Engineering Company, Inc., Gyeonggi-do (KR)

(72) Inventors: Sung Ho Hong, Seoul (KR); Jun Yub Lee, Gyeonggi-do (KR); Seok Joo Hong, Gyeonggi-do (KR); Sung Pill Cho, Gyeonggi-do (KR); Sung Chang Hong, Seoul (KR); Do Gyong Lee, Gyeonggi-do (KR); Sang Hyun Choi, Seoul (KR)

(73) Assignee: Korea Power Engineering Company, Inc., Gyeonggi-Do (KR)

( * ) Notice: Subject to any disclaimer, the term of this patent is extended or adjusted under 35 U.S.C. 154(b) by 0 days.

(21) Appl. No.: 13/861,570

(22) Filed: Apr. 12, 2013

(65) Prior Publication Data
US 2013/0272942 A1 Oct. 17, 2013

Related U.S. Application Data

(62) Division of application No. 11/992,820, filed as application No. PCT/KR2006/003444 on Aug. 31, 2006, now abandoned.

(30) Foreign Application Priority Data

Sep. 27, 2005 (KR) .................. 10-2005-0090011

(51) Int. Cl.
*B01J 23/00* (2006.01)

(52) U.S. Cl.
USPC ........... 502/309; 502/350; 502/306; 502/324; 502/312; 502/353; 423/239.1

(58) Field of Classification Search
USPC ......... 502/309, 312, 350, 353, 240, 306, 324; 423/239.1
See application file for complete search history.

(56) References Cited

U.S. PATENT DOCUMENTS

| 5,430,230 | A  | * | 7/1995  | Mitsui et al. | ............. | 588/320   |
| 6,641,790 | B2 | * | 11/2003 | Hong et al.   | ............. | 423/239.1 |
| 2003/0180205 | A1 | * | 9/2003  | Carlborg et al. | ........... | 423/239.1 |
| 2005/0069477 | A1 | * | 3/2005  | Hong et al.   | ............. | 423/239.1 |

* cited by examiner

*Primary Examiner* — Kaj K Olsen
*Assistant Examiner* — Pritesh Darji
(74) *Attorney, Agent, or Firm* — Abelman, Frayne & Schwab (57) ABSTRACT

Disclosed is a vanadium/titania-based catalyst including natural manganese ore for removing nitrogen oxides and dioxin in a wide operating temperature range and a method of using the same. Specifically, this invention pertains to a vanadium/titania ($V/TiO_2$)-based catalyst, including natural manganese ore, and a method for removing nitrogen oxides and dioxin over a wide operating temperature range, in which the $WTiO_2$ catalyst for selective catalytic reduction of nitrogen oxides and removal of dioxin contained in flue gas includes 5-30 wt % of natural manganese ore.

14 Claims, 9 Drawing Sheets

VANADIUM/TITANIA CATALYST COMPRISING NATURAL MANGANESE ORE FOR REMOVING NITROGEN OXIDES AND DIOXIN IN WIDE OPERATING TEMPERATURE RANGE AND METHOD OF USING THE SAME

CROSS-REFERENCE TO RELATED APPLICATIONS

This application is a divisional of application Ser. No. 11/992,820, filed 25 Mar., 2008, which is a National Phase of PCT/KR2006/003444, filed 31 Aug, 2006 which claims the priority of Korean Application No. 10-2005-0090011, filed 27 Sep. 2005, all of which are incorporated herein by reference.

TECHNICAL FIELD

The present invention relates to a vanadium/titania-based ($V/TiO_2$) catalysts comprising natural manganese ore (NMO) for removing nitrogen oxides and dioxin in a wide operating temperature range and a method of using the same. More particularly, the present invention relates to a $V/TiO_2$ catalyst comprising NMO for removal of nitrogen oxides and dioxin in a wide operating temperature range, in which the $V/TiO_2$ catalyst is mixed with NMO to increase the activity of removal of nitrogen oxides in the low temperature range so as to effectively remove nitrogen oxides and dioxin not only at high temperatures but also at low temperatures, and to a method of using the same.

BACKGROUND ART

Generally, fossil fuels are burned to produce energy for thermal power plants and industrial complexes, and also are burned in incinerators to decrease the volume of waste and to increase the chemical stability thereof. In such cases, various hazardous flue gases, such as carbon dioxide, sulfur dioxide ($SO_2$), nitrogen oxides ($NO_x$), dioxins, volatile organic compounds, heavy metals, etc., are produced. Among these flue gases, nitrogen oxides function as an environmental pollutant, which is harmful to the human body and causes photochemical smog or decreases a visibility distance. Nitrogen oxides are composed mainly of nitrogen monoxide (NO) and nitrogen dioxide ($NO_2$), in which NO constitutes 95% of total nitrogen oxides. As such, nitrogen oxides are classified into thermal $NO_x$, prompt $NO_x$, and fuel $NO_x$, depending on the formation procedure thereof.

In the case of a combustion boiler using fossil fuel, the fuel is pre-treated or combustion conditions are improved to reduce the emission of nitrogen oxides. However, in the interest of economy and efficiency, a combustion post-treatment process requiring an additional treatment procedure after the combustion is effective. Such combustion post-treatment includes catalytic cracking, selective catalytic reduction (SCR), selective non-catalytic reduction (SNCR), non-selective catalytic reduction (NSCR), and plasma treatment. Presently, SCR using an ammonia reducing agent is known to be the most effective.

Through ammonia-based SCR, on the surface of a denitrification catalyst, reactions take place as represented by Reactions 1 to 5 below:

$$4NO+4NH_3+O_2 \rightarrow 4N_2+6H_2O \quad \text{Reaction 1}$$

$$2NO_2+4NH_3+O_2 \rightarrow 3N_2+6H_2O \quad \text{Reaction 2}$$

$$6NO+4NH_3 \rightarrow 5N_2+6H_2O \quad \text{Reaction 3}$$

$$6NO_2+8NH_3 \rightarrow 7N_2+12H_2O \quad \text{Reaction 4}$$

$$NO+NO_2+2NH_3 \rightarrow 2N_2+3H_2O \quad \text{Reaction 5}$$

Although the denitrification catalyst useful in the ammonia-based SCR may be variously prepared, a denitrification catalyst comprising a titania support, vanadium, and optionally tungsten exhibits the greatest efficiency at present and thus has been commercialized and is used all over the world. The $V/TiO_2$ catalyst typically has high activity at 300~400° C., but is decreased with respect to nitrogen oxides removal efficiency due to low activation energy at temperatures lower than the above temperature. On the other hand, at temperatures higher than the above temperature, the ammonia reducing agent is oxidized, thus the stoichiometric ratio of the reaction becomes inappropriate, undesirably decreasing the efficiency. Further, the thermal fatigue of the catalyst is increased, leading to a shortened catalyst lifetime.

In the flue gas, water and sulfur oxides are generally present. Such materials function to produce an ammonium salt on the denitrification catalyst, lowering the activity of the catalyst. The reactions poisoning the catalyst progress according to Reactions 6 to 8 below:

$$2SO_2+O_2 \rightarrow 2SO_3 \quad \text{Reaction 6}$$

$$NH_3+SO_3+H_2O \rightarrow NH_4HSO_4 \quad \text{Reaction 7}$$

$$SO_3+H_2O \rightarrow H_2SO_4 \quad \text{Reaction 8}$$

Sulfur trioxide produced in Reaction 6 is formed into sulfate in Reaction 7, which is not decomposed on the surface of the catalyst but remains thereon, thus poisoning the catalyst. In addition, sulfuric acid produced in Reaction 8 corrodes a catalyst bed and equipment in the subsequent stage of the system.

Because the production of sulfur trioxide according to Reaction 6 actively proceeds at high temperatures, the development of a catalyst capable of realizing excellent SCR of nitrogen oxides at low temperatures has been required to minimize the above production so as to reduce the formation of sulfate and sulfuric acid in Reactions 7 and 8.

In addition, another important cause of inactivation of SCR in the low temperature range is ammonium nitrate formed at a low temperature of 200° C. or less through the reactions represented by Reactions 9 and 10 below:

$$2NH_3+2NO_2 \rightarrow NH_4NO_3+N_2+H_2O \quad \text{Reaction 9}$$

$$2NH_3+H_2O+2NO_2 \rightarrow NH_4NO_3+NH_4NO_2 \quad \text{Reaction 10}$$

Ammonium nitrite ($NH_4NO_2$) produced in Reaction 9 is very unstable, and thus is decomposed at 60° C. or higher, not causing a large problem. However, ammonium nitrate ($NH_4NO_3$) produced in Reaction 10 must be considered because it has a melting point of 170° C. Reactions 11 to 13 below show the decomposition of solid ammonium nitrate:

$$NH_4NO_3(s) \leftarrow \rightarrow NH_3+HNO_3 \quad \text{Reaction 11}$$

$$NH_4NO_3(s) \rightarrow N_2O+2H_2O \quad \text{Reaction 12}$$

$$2NH_4NO_3(s) \rightarrow 2N_2+O_2+4H_2O \quad \text{Reaction 13}$$

Generally, for efficient SCR in the presence of the $V/TiO_2$ catalyst, since the temperature of the flue gas should be maintained high in the range of 300~400° C., a process capable of supporting SCR is limited in the flue gas disposal process. For example, in the case of thermal power plants using coal or oil, the temperature after the economizer of a boiler may be a high temperature of about 350° C., and thus the SCR system can be installed. However, due to dust and/or sulfur dioxide having high concentration, the active sites of the denitrification catalyst may be lessened, and also the denitrification catalyst may be abraded. Further, ammonium sulfate may be formed in equipment in the subsequent stage of the system due to the oxidation of sulfur trioxide ($SO_3$), leading to corrosion of such equipment. Accordingly, methods of installing the SCR system downstream of a dust collector and a desulfurization system have been proposed. However, because the temperature of the flue gas decreases considerably while it passes through the dust collector and desulfurization system, there is the need for a denitrification catalyst suitable for use in SCR even at such low temperatures. Particularly, in the system for wet flue gas desulfurization (WFGD), no SCR is expected because the temperature of the flue gas is reduced to 100° C. or less, thus an additional reheating system is required. In order to increase the actual temperature of the flue gas by about 100° C., a large amount of power, corresponding to about 5~10% of the total power capacity of the power plant, is known to be consumed. In this way, flue gas denitrification using a conventional commercially available $V/TiO_2$ catalyst is a process that consumes a large amount of energy depending on the high-temperature activity of a denitrification catalyst. Moreover, with the intention of obtaining predetermined efficiency at low temperatures using the high-temperature catalyst, the catalyst should be provided in a larger amount. That is, when the amount of the catalyst is increased, not only the catalyst cost but also the costs related to a catalyst reactor, a duct, the amount of reducing agent and the reducing agent supply are increased, and as well, the pressure loss of the flue gas is increased, negatively affecting the total system.

The high-temperature operation facilitates thermal fatigue of the catalyst bed, undesirably shortening the lifetime of the catalyst. Further, since sulfur dioxide is highly oxidized, ammonium sulfate, acting as a cause of corrosion, is formed in equipment in the subsequent stage of the system for SCR. In addition, even though ammonium nitrate in addition to ammonium sulfate is formed on the surface of the denitrification catalyst, a denitrification catalyst capable of decomposing such materials at temperatures lower than a conventional temperature through the catalytic cracking reaction is required. Such properties depend on the excellent oxidation and/or reduction of the denitrification catalyst. That is to say, in order to solve problems related to economic benefits, inhibition of catalytic poisoning material and extension of lifetime of the catalyst, a low-temperature denitrification catalyst having higher denitrification performance even at a low temperature of 250° C. or less is required, unlike when using the conventional $V/TiO_2$ catalyst.

Meanwhile, manganese oxides of NMO function to easily induce the circulation of oxidation and reduction, and the oxidation state of the manganese ion thereof is readily changed, and thus the NMO may be applied to a variety of fields such as denitrification, ammonia oxidation, VOC removal, CO oxidation, etc. In addition, manganese oxides are known to have very high activity upon oxidation, and such activity may be easily understood through the change of oxidation state of manganese oxides in the gas-solid reaction. Recently, it has been reported that pure $MnO_2$ and manganese oxide supported on alumina exhibit very high activity upon the SCR reaction using ammonia as a reducing agent in the temperature range of 380~570 K (L. Singoredjo, R. Kover, F. Kapteijn and J. Moulijn, *Applied Catalysis B: Environ.*, 1, 297 (1992))

In regard to conventional NMO techniques for removing nitrogen oxides, Korean Patent Laid-open Publication No. 1998-086887 discloses the use of NMO to remove nitrogen oxides at low temperatures of 130~250° C. and to reduce unreacted ammonia emission through oxidation. According to Korean Patent Laid-open Publication No. 2002-0051885, NMO is heat treated at 300~400° C., or supported with one, two or more metal oxides selected from among tungsten (W), iron (Fe), copper (Cu), vanadium (V), zirconium (Zr), silver (Ag), cerium (Ce), platinum (Pt), and palladium (Pd) and is then heat treated at 300~400° C. to remove nitrogen oxides. In addition, according to Korean Patent Laid-open Publication No. 2000-0031268, sulfur oxides and nitrogen oxides may be simultaneously removed using a continuous fluidized-bed reactor in the presence of NMO (pyrolusite, $\beta$-$MnO_2$). Further, according to U.S. patent application Ser. No. 732,082, with the aim of realizing the low-temperature activity of a $V/TiO_2$ catalyst, based on the weight of supported vanadium, the sum of $V^{+4}$ and $V^{+3}$, represented by $V^{+x}$ ($x \leq 4$), should be 34 atoms/$cm^3$·wt % or more, and the sum of $Ti^{+3}$ and $Ti^{+2}$, represented by $Ti_{+y}$ ($y \leq 3$), should be 415 atoms/$cm^3$·wt % or more.

The emission source, such as an incineration facility, discharges a large amount of dioxins, in addition to nitrogen oxides, dioxins being the most poisonous material among materials known to date and having toxicity ten thousand times greater than the toxicity of potassium cyanide. Furthermore, dioxin is nobiodegradable, stable even at 700° C., and accumulates in the body and thus negatively affects the human body, causing side effects too numerous to be completely listed, and including cancers, reproduction toxicity, malformation, liver toxicity, thyroid gland disorders, cardiac disorders, etc.

Accordingly, with the aim of reducing the emission of such dioxins, there are exemplified control methods before incineration, including preliminary removal of a dioxin precursor and uniform supply of waste, control methods during incineration, including suitable operating temperature and resident time, combustion air and mixing, minimization of fly ash particles and control of temperature of flue gas, and control methods after incineration, including a combination of a wet washer, a dry washer, an activated carbon sprayer, a dust collector, SNCR, and SCR devices. In the control method before the incineration, the composition of waste is analyzed, relationships with harmful material generated after combustion are investigated, the type of waste functioning as a main pollutant is preliminarily sorted, the amount and size of waste to be added to the incinerator are maintained constant, and the composition, heat value, water content, and volatile component content are made constant, thus uniformly maintaining the combustion environment in the furnace.

The control method during the incineration controls the 3 Ts, that is, 1) temperature of 850° C. or more
2) time of 2 sec or longer
3) turbulence due to the geometry of the incinerator and second air injection.

That is, such combustion conditions are efficiently controlled and maintained, and therefore non-burned carbon or hydrocarbon in the combustion gas, in particular, a precursor capable of being easily converted into dioxins, for example, chlorobenzene or polychlorinated biphenyl, may be produced in a smaller amount.

In the control methods after the incineration, a method of adsorbing a pollutant using an activated carbon and then continuously passing it through an oxidation catalyst bed to control it is most effective. However, due to the problems with techniques and performance of the catalyst bed, the control of dioxin is mainly dependent on adsorption using an adsorbent, such as activated carbon and calcium hydroxide. Moreover, the reproduction or disposal of the adsorbent having dioxin adsorbed thereon is technically difficult, and thus an economic burden may be imposed. That is, presently available methods of adsorbing dioxin in the flue gas using activated carbon suffer because the activated carbon on which dioxin is adsorbed is difficult to reproduce or dispose, and thus economic benefits are negated.

Typically, as a catalyst for the oxidation of dioxin as a volatile halogen organic material, a catalyst obtained by adding $WO_3$ or $MoO_3$ to $V_2O_5/TiO_2$, such as an SCR catalyst, is useful although the amount thereof must be varied for optimal activity. Like nitrogen oxides, dioxins need to be removed at temperatures as low as possible. This is because requiring less energy for heating the combustion flue gas is economically preferable, and materials decomposed by the catalyst may be undesirably re-synthesized at 205° C. or higher in the presence of oxide of metal (Cu, Fe, etc.).

DISCLOSURE

Technical Problem

Leading to the present invention, intensive and thorough research into the effective removal of dioxin, as well as nitrogen oxides through SCR using an ammonia reducing agent not only at low temperatures of 250° C. or less but also at high temperatures of 300~400° C., carried out by the present inventors, aiming to overcome the problems encountered in the prior art, resulted in the finding that a predetermined amount of NMO can be added to a $V/TiO_2$ catalyst to form a novel composite oxide, which thus can exhibit excellent denitrification performance not only at high temperatures but also at low temperatures and which furthermore can remove dioxin.

Accordingly, an object of the present invention is to provide a vanadium/titania catalyst comprising NMO for removing nitrogen oxides and dioxin in a wide operating temperature range, capable of exhibiting excellent activity of removal of nitrogen oxides and dioxin not only at high temperatures but also at low temperatures.

Another object of the present invention is to provide a method of SCR of nitrogen oxides and removal of dioxin in a wide temperature range.

Technical Solution

In order to accomplish the above objects, the present invention provides a $V/TiO_2$ catalyst comprising NMO for removing nitrogen oxides and dioxin in a wide operating temperature range, wherein the $V/TiO_2$ catalyst suitable for use in SCR of nitrogen oxides and removal of dioxin contained in flue gas comprises 5~30 wt % of the NMO.

In addition, the present invention provides a method of SCR of nitrogen oxides and removal of dioxin, contained in flue gas, which is conducted at 150~450° C. at a gas hourly space velocity (GHSV) of 1000~60000 $hr^{-1}$ in the presence of the catalyst mentioned above.

BEST MODE

Hereinafter, a detailed description will be given of the present invention.

As mentioned above, the catalyst of the present invention ($NMO+V/TiO_2$ catalyst) includes NMO and thus exhibits excellent activity on the SCR of nitrogen oxides and on removal of dioxin not only at high temperatures but also at low temperatures.

The NMO is present in various forms, such as pyrolusite, psilomelane, manganite, braunite, or hausmanite, as shown in Table 1 below.

TABLE 1

| Type | Composition | Specific Gravity | Mn (%) |
|---|---|---|---|
| Pyrolusite | $MnO_2$ | 4.8 | 63.2 |
| Psilomelane | | 3.7~4.7 | 45~60 |
| Manganite | $Mn_2O_3 \cdot H_2O$ | 4.2~4.4 | 62.4 |
| Braunite | $3Mn_2O_3 \cdot MnSiO_3$ | 4.8 | 62 |
| Hausmanite | $Mn_3O_4$ | 4.8 | 72 |
| Rhodochrosite or Dialogite | $MnCO_3$ | | 47 |
| Rhodonite | $MnSiO_3$ | | 42 |
| Bementite | Hydrated Silicate | | 31 |

The NMO mainly exists in the form of pyrolusite and psilomelane. The NMO used in the present invention is pyrolusite, in which manganese oxide is mainly composed of β-$MnO_2$, and the physicochemical properties thereof are shown in Table 2 below.

TABLE 2

(1) Chemical Analysis (wt %)

| Constituent | Mn | $SiO_2$ | $Al_2O_3$ | Fe | CaO | MgO | $O_2$ relative to Mn and Fe |
|---|---|---|---|---|---|---|---|
| wt % | 51.85 | 3.13 | 2.51 | 3.86 | 0.11 | 0.25 | 38.33 |

(2) Physical Properties

| | |
|---|---|
| Average Particle Size (mm) | 0.359 |
| Density ($kg/m^3$) | 3980 |
| Pore Volume ($cm^3/g$) | 0.0369 (5~3000 Å) |
| Specific Surface Area ($m^2/g$) | 20.0 |

As shown in Table 2, the NMO, comprising various metal oxides, Mn, and Fe, may be used as the catalyst for SCR, and has excellent nitrogen oxides conversion at a low temperature (about 150° C.).

The NMO of the present invention is prepared through the following procedure. According to the present invention, NMO is dried and calcined. As such, the drying process is preferably conducted at 100~110° C. for 4~10 hours, and the calcination process is preferably carried out at 100~500° C. for 3~5 hours in an air atmosphere. Subsequently, the dried and calcined NMO powder is compressed at a pressure of 4,000~6,000 psi to form a pellet, which is then milled to an average particle size of 300~425 μm.

The $V/TiO_2$ catalyst of the present invention is formed by supporting vanadium on titania ($TiO_2$). The titania support of the present invention should be used in supporting the SCR catalyst. That is, since titania for paint or an optical catalyst is unsuitable for use in the present invention in consideration of performance and price, titania produced as a catalyst support is employed. The preferred physical properties of titania, usable as the support of the present invention, are shown in Table 3 below, but the present invention is not limited thereto.

In Table 3 below, tungsten is a co-catalyst which is selectively added to the SCR catalyst, and may be added in order to increase thermal durability and resistance to $SO_2$. However, tungsten does not greatly affect the nitrogen oxides removal performance of the catalyst of the present invention.

When using tungsten, titania may be first supported with tungsten and calcined to form a mixture support which is then supported with vanadium, or titania may be simultaneously supported with tungsten and vanadium. During the calcination process, tungsten is converted into oxide, and the amount of tungsten oxides is about 0~15 wt %, and preferably, 5~10 wt %, based on the weight of titania.

TABLE 3

| | |
|---|---|
| $TiO_2$ Amount | 85~100 wt % |
| Particle Size | 15~40 nm |
| Specific Surface | 50~120 $m^2/g$ |
| Anatase Amount | 75~100 wt % |
| Tungsten Oxide Amount | 0~10 wt % |
| Average Pore Volume | 0.1~0.5 $cm^3/g$ |

Examples of the vanadium precursor of the present invention include, but are not particularly limited to, ammonium metavanadate ($NH_4VO_3$), vanadium oxytrichloride ($VOCl_3$), etc. According to the present invention, the catalyst is prepared through a wet impregnation process using a solution of quantified ammonium metavanadate ($NH_4VO_3$) dissolved in distilled water and oxalic acid (($COOH)_2$). Specifically, the amount of vanadium relative to titania is calculated according to the desired composition ratio. Thus, in consideration of economic benefits, performance and $SO_2$ oxidation performance, vanadium is preferably added in an amount of 0.5~10 wt % based on the element of the support. The vanadium precursor is dissolved in a calculated amount in distilled water heated to 50~70° C. In this case, when ammonium metavanadate is used as the precursor, since it has very low solubility, solubility thereof is increased in a manner such that the aqueous solution is continuously mixed with oxalic acid while being slowly stirred to attain a pH of 2.5. The resulting solution has a light orange color. Subsequently, the solution is mixed with the calculated amount of titania while being continuously stirred, and the mixture slurry thus obtained is completely mixed, and then water is removed.

According to the present invention, in order to prepare the catalyst, the slurry is stirred for 1 hour or longer, after which water is evaporated at 70° C. using a rotary vacuum evaporator. Subsequently, the resulting product is further dried at 100~110° C. for 24 hours, heated to 300~500° C. at a rate of 5~20° C./min, and calcined at that temperature for 1~10 hours in an air atmosphere, yielding the catalyst. The drying oven and the calcination furnace used in the present invention are not particularly limited with respect to the forms thereof, and may include commercially available ones.

Then, NMO and $V/TiO_2$ thus prepared are mixed at a predetermined weight ratio and are wet mixed using distilled water, in which NMO is mixed with $V/TiO_2$ in an amount of 5~30 wt %. In the present invention, a ball-milling process is used to realize high dispersion, but the present invention is not limited thereto. When the amount of NMO is less than 5 wt %, an increase in nitrogen oxides removal performance at low temperatures becomes insignificant. On the other hand, when the amount exceeds 30 wt %, nitrogen oxides removal performance is somewhat decreased. The mixed catalyst is dried at 80~110° C. for 224 hours and then calcined at 100~500° C. for 2~6 hours in an air atmosphere. In such a case, in the mixed catalyst, a chemical reaction progresses between NMO and $V/TiO_2$, and thus a chemical structure different from the surfaces of the catalysts before they are mixed results, thereby exhibiting denitrification properties in a wide temperature range. When NMO and $V/TiO_2$ are mixed to a high degree of dispersion through a wet mixing process, dried, and then calcined at a high temperature, lattice oxygen migration to the contact surface between NMO and $V/TiO_2$ is induced by high heat energy supplied during the calcination process such that the different structures between the two catalysts are reorganized into a novel stable structure. That is, in the NMO composed of $MnO_2$ and in the $V/TiO_2$ catalyst composed of $V_2O_5$ and $TiO_2$, the number of lattice oxygen atoms surrounding the metal atom varies due to the different oxidation value of each metal atom. The lattice oxygen migration is caused by the difference between oxygen affinities of metal oxides during the high-temperature calcination process. The resulting mixed catalyst has a structure different from the original structure of the catalyst. Therefore, the NMO+$V/TiO_2$ catalyst of the present invention is not a simple mixture, but a catalyst having a novel structure.

The catalyst of the present invention thus prepared may be used by applying it on a metal plate, metal fibers, a ceramic filter or a honeycombed structure or by adding a small amount of binder thereto and then extruding it in the form of a particle or monolith. As such, the catalyst is uniformly milled to a particle size of about 1~10 μm to apply or extrude it, such application and extrusion processes being widely known in the art. Further, the mixed catalyst of the present invention may be used by applying it on an air preheater, or on all of the tubes, the ducts, and/or the wall of a boiler.

The process of removing nitrogen oxides using the catalyst of the present invention is conducted at 150~450° C., and preferably 200~400° C., at GHSV of about 1,000~60,000 hr$^{-1}$, and preferably 5,000~15,000 hr$^{-1}$, in the presence of the catalyst of the present invention.

In this case, for the SCR of nitrogen oxides, it is preferred that the ammonia reducing agent be supplied at a molar ratio of $NH_3/NO_x$ of 0.6~1.2. If the molar ratio is less than 0.6, nitrogen oxides removal efficiency is decreased due to the lack of the reducing agent. On the other hand, if the molar ratio exceeds 1.2, unreacted ammonia may be emitted. Particularly, in the case where nitrogen oxides are removed from flue gas containing sulfur oxides such as sulfur dioxide, unreacted ammonia emission should be maximally reduced so as to effectively prevent the poisoning of the catalyst attributable to the production of ammonium sulfate.

The reason why the $NMO+V/TiO_2$ catalyst of the present invention exhibits high nitrogen oxides removal efficiency not only at high temperatures but also at low temperatures is because oxidation of ammonia is prevented and the surface structure of the catalyst is changed through the mixing of two materials, thus manifesting a synergetic effect. When the NMO is used alone as the catalyst of the SCR reaction, ammonia added as the reducing agent may be oxidized by the high oxidation capability of the NMO at a high temperature of 300° C. In this way, the oxidation of ammonia causes the production of NO or $NO_2$ which is desirably removed through reduction. Further, although ammonia is adsorbed on the surface of the catalyst to exhibit a reduction function, the amount thereof is insufficient due to oxidation, and thus the SCR reaction does not proceed any further. As a result, nitrogen oxide removal efficiency may be decreased. Accordingly, the NMO may be used alone as the SCR catalyst only in the temperature range of 200° C. or less. That is, the NMO having high oxidation capability is impossible to use as the SCR catalyst in a wide temperature range including low temperatures of 250° C. or less and high temperatures of 300° C. or more.

Therefore, as in the present invention, when the catalyst is prepared by mixing the NMO with $V/TiO_2$, the above problems may be overcome. That is, the ammonia oxidation of the NMO at high temperatures may be prevented by the use of the $V/TiO_2$ catalyst, such that the usability of ammonia as a reducing agent increases. In this way, the reason why the catalyst of the present invention has higher activity than a conventional $V/TiO_2$ catalyst not only at high temperatures but also at low temperatures is believed to be because the properties of the catalyst are modified through the mixing with the NMO. In order to evaluate the properties of the catalyst of the present invention, an oxygen shutting-off test was conducted. The SCR reaction is one of oxidation/reduction reaction. The oxidation/reduction reaction takes place through electron transfer between the catalyst and the chemical species, and efficient electron transfer results in high activity. In an actual reaction, electron transfer is realized through the migration of oxygen. As such, lattice oxygen of the catalyst functions as an electron acceptor or an electron donor. Hence, lattice oxygen of the catalyst is regarded as a very important factor determining the activity of the catalyst. The oxygen shutting-off test for evaluating the lattice oxygen of the catalyst is performed as follows. That is, 200 ppm NO, 200 ppm $NH_3$ and 15% oxygen are added to each of the catalyst of the present invention and the conventional $V/TiO_2$ catalyst at a predetermined temperature (200° C. in the present invention), and the supply of oxygen is immediately blocked in the course of stably performing the SCR reaction, and thus, 1 hour after blocking the supply of oxygen, the supply of oxygen is immediately resumed to detect the emission concentration of NO. When the supply of oxygen is blocked, the SCR reaction takes place using lattice oxygen of the catalyst. That is, after blocking the supply of oxygen, since the SCR reaction proceeds for a predetermined period of time using such lattice oxygen, nitrogen oxides removal efficiency is not drastically decreased. The lattice oxygen of the catalyst is supplied as long as it exhibits nitrogen oxides removal efficiency. The period of time during which nitrogen oxides removal efficiency is exhibited is proportional to the amount of lattice oxygen of the catalyst.

The denitrification catalyst of the present invention functions to exhibit the ability to supply the lattice oxygen of the catalyst, that is, to increase the oxidation capability as well as the reducibility of the lattice oxygen. Such properties can be confirmed through a catalyst re-oxidation test. Each of the catalyst of the present invention and the conventional denitrification catalyst is loaded in a predetermined amount, and is then allowed to react with 0.5% $NH_3$ at 400° C. for 30 min to reduce it, after which the reduced catalyst is cooled to room temperature and then added with 1% $O_2$. When the signal of oxygen reaches a steady state, the reduced catalyst is re-oxidized using gaseous oxygen while being heated at a rate of 10° C./min, during which the amount of oxygen consumed is measured using a Quadrupole mass spectrometer (Prisma™ QMI 422, Pfeiffer Vacuum Co., Germany). According to this test, when the temperature required for oxygen consumption is low, the re-oxidation property of oxygen is regarded as excellent. That is, through the oxygen shutting-off test and catalyst re-oxidation test, the catalyst of the present invention can be proven to have superior nitrogen oxides removal properties even at low temperatures.

Further, the catalyst of the present invention functions to decompose ammonium nitrate formed on the surface thereof at low temperatures. According to the present invention, 1 g of ammonium nitrate is supported on 10 g of the catalyst of the present invention and then dried. When 0.1 g of the sample thus obtained is heated at a rate of 10° C./min in the presence of 3% oxygen flowing at a rate of 50 cc/min, ammonium nitrate begins to be decomposed at 173° C.

Moreover, in the case where dioxin is present in the flue gas, the $NMO+V/TiO_2$ catalyst of the present invention functions to simultaneously realize the SCR of nitrogen oxides and the removal of dioxin. This is because the oxidation of dioxin is caused at an active site (V—O—Ti) different from active sites (e.g., V=O and V—OH) required for the removal of nitrogen oxides over the catalyst of the present invention. Typically, although 0~500 ppm dioxin is present in the flue gas of the incinerator, it may be removed using the catalyst of the present invention.

Therefore, the catalyst of the present invention may be used for SCR of nitrogen oxides and for removal of dioxin in the temperature range (150~450° C.) including not only a high temperature range but also a low temperature range. In particular, ammonium nitrate formed on the surface of the catalyst may be decomposed at low temperatures and thus the inactivation of the catalyst may be prevented at low temperatures. As well, the emission of unreacted ammonium can be reduced, hence preventing self-poisoning thereof and the formation of ammonium sulfate. Thereby, the activity of the catalyst can desirably continue. Also, the use of the catalyst of the present invention is advantageous because dioxin may be removed along with nitrogen oxides, thus decreasing the cost of supporting an additional dioxin disposal system, resulting in economic benefits.

Figure 1:
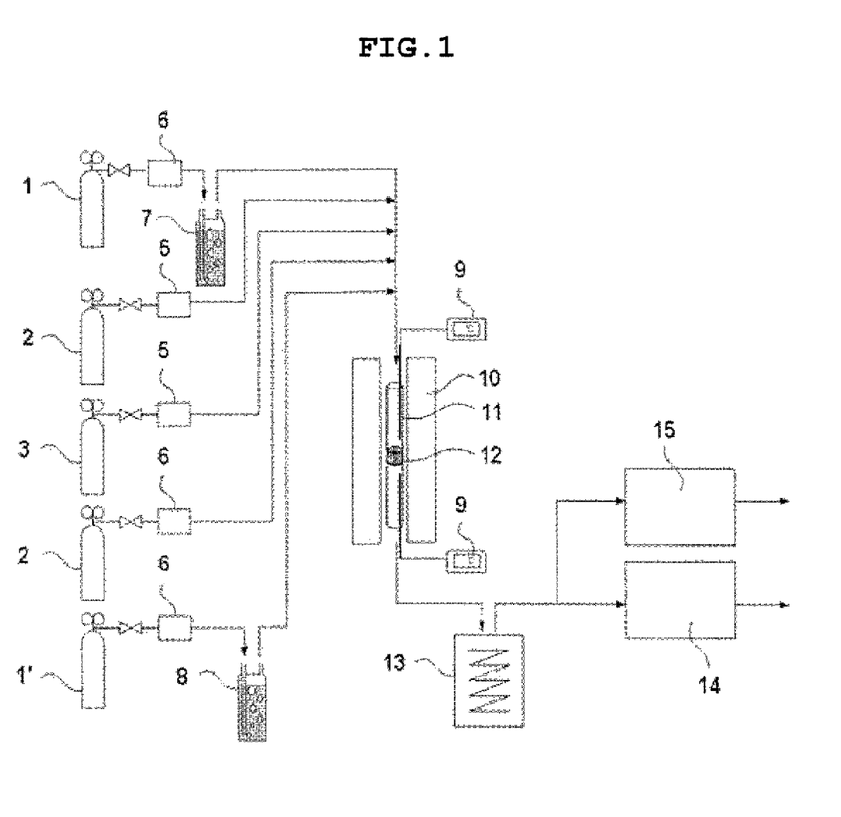
FIG. 1 is a view schematically showing the structure of a device for evaluating the performance of the catalyst of the present invention on SCR of nitrogen oxides and on removal of dioxin.

In the present invention, a fixed-bed reactor for use in evaluating the nitrogen oxide removal performance of the catalyst of the present invention for the removal of nitrogen oxides and/or dioxin is shown in FIG. 1. As shown in FIG. 1, the fixed-bed reactor comprises a gas supply part, a reaction part, and a reactive gas analysis part. The gas supplied into the reactor 10 includes nitrogen 1, oxygen 2, nitrogen monoxide 3, and ammonia 4 as a reducing agent, the flow rate of each of which is controlled using the mass flow controller (MFC) 6 of a gas supply cylinder. Further, water is supplied in a manner such that nitrogen is added to the reactor in a state of being contained in water while passing through the aqueous solution. As such, water at a predetermined temperature is circulated using a thermostat outside a double jacket-shaped bubbler 7 so as to make the supply amount thereof uniform. The gas supply pipe throughout the reactor is preferably made of stainless steel. The reaction part, which is a continuous flow type fixed-bed reaction device, is manufactured from a quartz pipe 11 having an inner diameter of 8 mm and a height of 60 cm, and includes glass cotton to fix the catalyst bed 12. The temperature of the reactor is adjusted through a temperature controller 9 using a thermocouple mounted to the upper portion of the fixed bed. Also, the temperature of the gas supply part is measured by mounting a thermocouple having the same shape to the lower portion of the catalyst layer to determine the difference between the temperatures of upper and lower portions of the catalyst bed.

In order to analyze the concentrations of the reactant and product, nitrogen monoxide is measured using a non-dispersion type infrared gas analyzer 14. As such, before being supplied into the gas analyzer, water is removed using a water remover 13.

Further, to evaluate dioxin removal performance, the device of FIG. 1 may be constructed. That is, nitrogen 1' is supplied into the gas supply part while passing through an aqueous 1,2-DCB (dichlorobenze) solution 8 having a predetermined concentration, and the reaction part is structured under the same conditions as above. In the detection part, the emission concentration of 1,2-DCB is measured using a total hydrocarbon (THC) detector 15. In this case, the 1,2-DCB has a structure similar to dioxin, and thus is broadly used as a material for the decomposition of dioxin.

The nitrogen oxides removal performance test of the denitrification catalyst of the present invention is carried out using the device of FIG. 1. With the intention of maintaining the denitrification catalyst uniform, the prepared catalyst is compressed at a pressure of 5000 psi using a hydraulic press to form a pellet, which is then filtered, thus obtaining a catalyst having a size of 40~50 mesh. Using the size-controlled catalyst, the denitrification test in a steady state is performed through the following procedures.

1) A predetermined amount of catalyst is loaded in the reactor 11.

2) The catalyst is pretreated at 400° C. for 1 hour in an air atmosphere to remove impurities therefrom and attain a uniform oxidation state thereof.

3) The pretreated catalyst is cooled to a desired test temperature and is maintained thereat for 1 hour so as to attain a steady state of the test temperature.

4) When the test temperature reaches a steady state, a predetermined amount of known gas is supplied into the reactor and the reaction test progresses until the concentration of the product is constant, after which that concentration is recorded.

The nitrogen oxides removal performance of the denitrification catalyst is represented by nitrogen oxides conversion and is calculated according to Equation 1 below:

$$NO_x \text{ Conversion}(\%) = \frac{\text{Supply Concentration of } NO_x - \text{Emission Concentration of } NO_x}{\text{Supply Concentration of } NO_x} \times 100 \quad \text{Equation 1}$$

The 1,2-DCB removal performance test of the NMO+V/$TiO_2$ catalyst of the present invention is conducted using the device of FIG. 1, through control of the supply concentration of 1,2-DCB. In addition, the dioxin removal performance of the catalyst of the present invention is represented by 1,2-DCB conversion and is calculated according to Equation 2 below:

$$1,2\text{-}DCB \text{ Conversion }(\%) = \frac{\text{Supply Concentration of } 1,2\text{-}DCB - \text{Emission Concentration of } 1,2\text{-}DCB}{\text{Supply Concentration of } 1,2\text{-}DCB} \times 100 \quad \text{Equation 2}$$

MODE FOR INVENTION

A better understanding of the present invention may be obtained through the following examples which are set forth to illustrate, but are not to be construed as the limit of the present invention.

PREPARATIVE EXAMPLE 1

Preparation of NMO

NMO was used by drying it at 100~110° C. for 4~12 hours without additional chemical treatment and then calcining it at 400° C. for 4 hours in an air atmosphere. The dried and calcined NMO powder was compressed at a pressure of 5000 psi to form a pellet, which was then milled to an average particle size of 400 μm.

PREPARATIVE EXAMPLE 2

Preparation of V/$TiO_2$ (N) without Tungsten 2 wt % of ammonium metavanadate was quantified relative to 100 g of a titania support having the properties shown in Table 3 and then dissolved in 150 ml of distilled water heated to 60° C. In such a case, in order to increase the solubility of ammonium metavanadate, oxalic acid was added to set the pH of the solution to 2.5. The solution was mixed with the titania support and sufficiently stirred, thus preparing a slurry. Subsequently, water was removed at 70° C. using a rotary vacuum evaporator. The resulting product was further dried at 110° C. for 24 hours and then coarsely milled. The milled catalyst powder was loaded into a tubular calcination furnace, heated to 400° C. at a rate of 10° C./min with the supply of air at a flow rate of 500 ml/min, and then calcined at that temperature for 4 hours in an air atmosphere. Below, the V/$TiO_2$ catalyst having no tungsten supported thereon is referred to as V/$TiO_2$ (N).

PREPARATION EXAMPLE 3

Preparation of V/TiO$_2$(W) with Tungsten 12.35 g of ammonium tungstate ((NH$_4$)$_2$WO$_4$) was dissolved in 30 ml of distilled water, and the resulting solution was heated to about 60° C. to completely dissolve it. After the solution was cooled to room temperature, 100 g of titania was added thereto to obtain a slurry. The slurry was heated to about 70° C. while stirring it to evaporate water therefrom. After the completion of the evaporation of water, a drying process was conducted at about 120° C. for 24 hours and then a calcination process was conducted at 500° C. for 10 hours in an air atmosphere, thus preparing a tungsten-titania mixed support. Subsequently, the same procedure as in Preparative Example 2 was conducted, resulting in a V/TiO$_2$ catalyst having tungsten supported thereon, which is referred to as V/TiO$_2$(W).

EXAMPLE 1

The NMO of Preparative Example 1 was mixed with the V/TiO$_2$ (N) catalyst of Preparative Example 2 through a ball milling process, thus preparing a mixed catalyst. The V/TiO$_2$ (N) catalyst and NMO were mixed at a weight ratio of 10:1 and then ball milled.

EXAMPLE 2

A mixed catalyst was prepared in the same manner as in Example 1, with the exception that the NMO of Preparative Example 1 and the V/TiO$_2$ (W) catalyst of Preparative Example 3 were used.

EXAMPLE 3

Nitrogen Oxides Removal Performance

The catalyst (NMO+V/TiO$_2$(N)) of Example 1, the catalyst (NMO+V/TiO$_2$(W)) of Example 2 and, for comparison with the catalysts of the present invention, the catalyst (NMO) of Preparative Example 1, the catalyst (V/TiO$_2$(N)) of Preparative Example 2 and the catalyst (V/TiO$_2$(W)) of Preparative Example 3 were subjected to a nitrogen oxides removal performance test at a high temperature and a low temperature using the fixed-bed test device of FIG. 1. Then, 200 ppm NO$_x$, 15% oxygen and 8% water were supplied, and nitrogen was supplemented such that the total gas flow rate was 500 ml/min. 0.5 ml of the denitrification catalyst was loaded and the GHSV was set to 60,000 hr$^{-1}$. As the reducing agent including urea or ammonia, ammonia was used in the present example. The molar ratio of NH$_3$/NOx was 1.0, and the reaction temperature was adjusted to 150~300° C. The nitrogen oxides removal performance and the emission concentration of unreacted ammonia were measured. The results are given in Table 4 below, and FIGS. 2 and 3.

Figure 2:
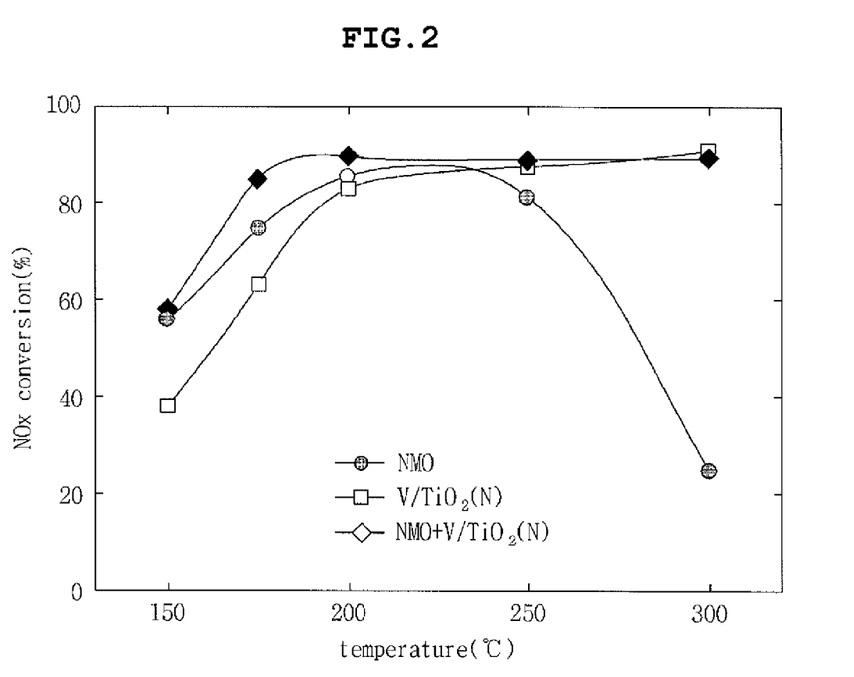
FIG. 2 is a graph showing the nitrogen oxides removal performance of the catalyst ($NMO+V/TiO_2$ (N)) containing no tungsten of the present invention, NMO, and a $V/TiO_2$ (N) catalyst, varying depending on the reaction temperature.

In the results of nitrogen oxides removal performance, as in Table 4 and FIG. 2, the NMO+V/TiO$_2$(N) catalyst is seen to have higher activity than the NMO or V/TiO$_2$(N) catalyst in a wide temperature range including low temperature and high temperature. As such, the NMO has excellent nitrogen oxides removal performance at low temperatures, and the V/TiO$_2$(N) catalyst has excellent nitrogen oxides removal performance at high temperatures. Further, the NMO+V/TiO$_2$(N) catalyst, resulting from mixing the above two catalysts, has activity higher than the nitrogen oxides removal activities of respective catalysts, which is believed to be because the synergetic effect results from mixing NMO and V/TiO$_2$ to form composite oxide of Mn—V—TiO$_2$, functioning to improve the SCR, thus remarkably increasing the activity of the catalyst of removing nitrogen oxides.

TABLE 4

| | Reaction Temp (° C.) | NMO (P. Ex. 1) | V/TiO$_2$(N) (P. Ex. 2) | NMO + V/TiO$_2$(N) (Ex. 2) |
|---|---|---|---|---|
| NO$_x$ Removal Efficiency (%) | 300 | 23.81 | 90.48 | 89.52 |
| | 250 | 80.95 | 87.62 | 88.57 |
| | 200 | 85.24 | 82.86 | 89.52 |
| | 175 | 74.76 | 62.86 | 84.76 |
| | 150 | 55.71 | 38.09 | 58.09 |
| Unreacted Ammonia (ppm) | 300 | 0 | 0 | 0 |
| | 250 | 0 | 0 | 0 |
| | 200 | 8 | 3 | 0 |
| | 175 | 43 | 45 | 6 |
| | 150 | 70 | 110 | 60 |

Figure 3:
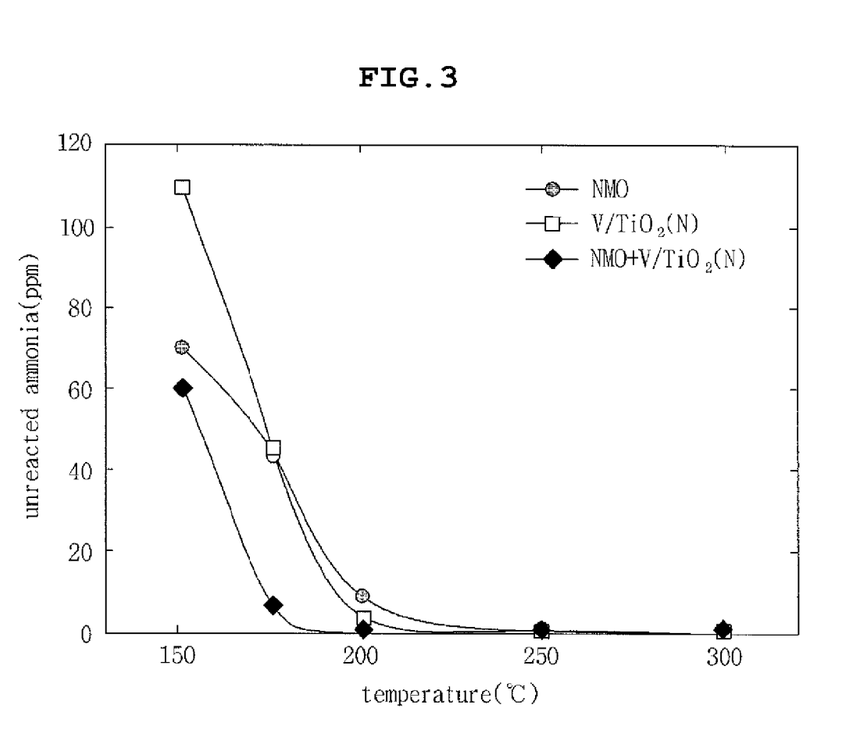
FIG. 3 is a graph showing the emission of unreacted ammonia of the catalyst ($NMO+V/TiO_2$ (N)) containing no tungsten of the present invention, the NMO, and the $V/TiO_2$ (N) catalyst, varying depending on the reaction temperature upon removal of nitrogen oxides.

FIG. 3 and Table 4 show the results of emission concentration of unreacted ammonia, simultaneously obtained in the nitrogen oxides removal performance test. As is apparent in the results of Table 4 and FIG. 3, the emission concentration of unreacted ammonia is inversely proportional to the nitrogen oxides removal efficiency. Particularly, the emission concentration of unreacted ammonia when using the NMO+V/TiO$_2$(N) catalyst can be confirmed to be lower than that when using the NMO or V/TiO$_2$(N) catalyst. Thus, it has been proven that the mixed catalyst of the present invention can reduce the emission of unreacted ammonia.

Figure 4:
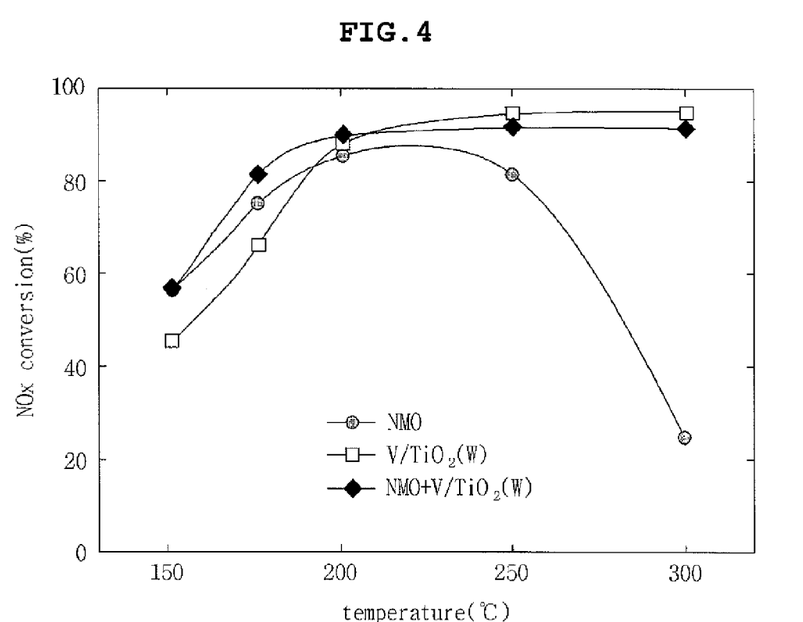
FIG. 4 is a graph showing the nitrogen oxides removal performance of the catalyst ($NMO+V/TiO_2$ (W)) containing tungsten of the present invention, the NMO, and the $V/TiO_2$ (W) catalyst, varying depending on the reaction temperature.
Figure 5:
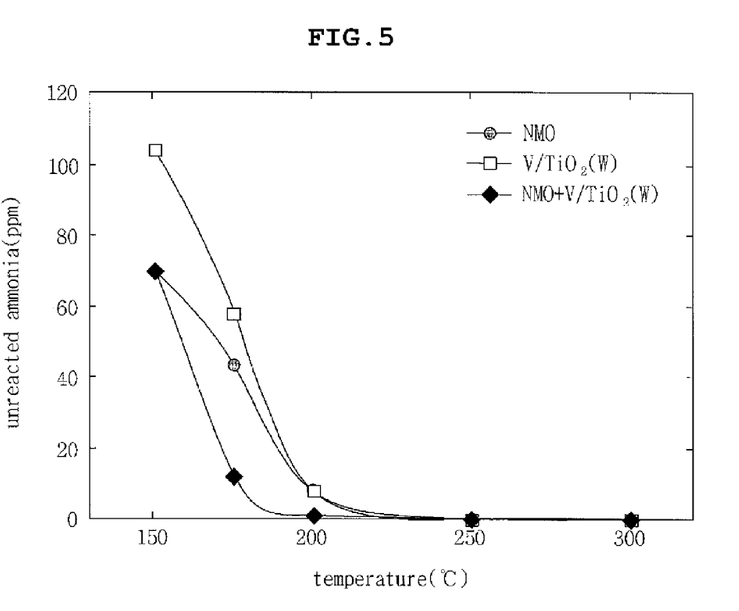
FIG. 5 is a graph showing the emission of unreacted ammonia of the catalyst ($NMO+V/TiO_2$ (W)) containing tungsten of the present invention, the NMO, and the $V/TiO_2$ (W) catalyst, varying depending on the reaction temperature upon the removal of nitrogen oxides.

In addition, using the V/TiO$_2$(W) catalyst, the nitrogen oxides removal performance and the emission concentration of unreacted ammonia were measured as above. The results are shown in Table 5 and FIGS. 4 and 5. The results of FIG. 4 are similar to those of FIG. 2. Although the low-temperature activity of the V/TiO$_2$(W) catalyst is higher than that of the V/TiO$_2$(N) catalyst thanks to the presence of tungsten, it is similar to that of the catalyst of the present invention, comprising NMO. Naturally, the catalyst of the present invention comprising NMO has better low-temperature and high-temperature activities, compared to when NMO is used alone. Thus, the addition of NMO results in improvement of the nitrogen oxides removal performance of the catalyst regardless of whether the titania support includes tungsten or not. FIG. 5 shows the emission concentration of unreacted ammonia, which is similar to the result of FIG. 3.

In the case of NMO, nitrogen oxides removal performance is deteriorated, but unreacted ammonia is not detected in the high temperature range of 250° C. or more. This means that ammonia added as the reducing agent is oxidized and thus has low usability as a reducing agent. Since the oxidation of ammonia at a high temperature leads to the formation of NO or NO$_2$, the ammonia reducing agent is further required. The oxidation properties of the NMO deteriorate the nitrogen oxides removal performance at high temperatures. However, as in the present invention, the above problems can be overcome by mixing the NMO and the V/TiO$_2$ catalyst. From the results of evaluation of the activity of the NMO+V/TiO$_2$(W) catalyst, high nitrogen oxide removal efficiency and low emission of unreacted ammonia at high temperatures can be confirmed. Moreover, as seen in the NMO+V/TiO$_2$(N) catalyst, when the NMO and the V/TiO$_2$ catalyst are mixed, the oxidation of ammonia is prevented. Accordingly, there is provided a synergetic effect exhibiting high nitrogen oxides removal efficiency even in the high temperature range.

TABLE 5

| | Reaction Temp (° C.) | NMO | V/TiO$_2$(W) | NMO + V/TiO$_2$(W) |
|---|---|---|---|---|
| NOx Removal Efficiency (%) | 300 | 23.81 | 94.76 | 91.43 |
| | 250 | 80.95 | 94.29 | 91.43 |
| | 200 | 85.24 | 87.62 | 89.52 |
| | 175 | 74.76 | 65.71 | 80.95 |
| | 150 | 55.71 | 44.76 | 56.19 |
| Unreacted Ammonia (ppm) | 300 | 0 | 0 | 0 |
| | 250 | 0 | 0 | 0 |
| | 200 | 8 | 8 | 1 |
| | 175 | 43 | 58 | 12 |
| | 150 | 70 | 104 | 70 |

EXAMPLE 4

Nitrogen Oxides Removal Performance Depending on Mixing Ratio of NMO

The nitrogen oxides removal performance was evaluated depending on the proportion of NMO in the NMO+V/TiO$_2$ catalyst. The results are given in Table 6 below. As shown in Table 6, when the NMO is used in an amount of 5~30 wt %, nitrogen oxides removal efficiency is increased at low temperatures of 250° C. or lower. However, when the NMO is used in an amount of 40 wt %, which exceeds 30 wt %, the removal efficiency is rather decreased. Thus, it is preferred that the NMO be used in an amount of about 5~30 wt %.

TABLE 6

| Amount of NMO (wt %) | Reaction Temperature (° C.) | | | | | |
|---|---|---|---|---|---|---|
| | 400 | 300 | 250 | 200 | 175 | 150 |
| 0 | 90.0 | 96.2 | 96.2 | 79.0 | 59.0 | 34.3 |
| 5 | 90.0 | 96.8 | 96.5 | 81.2 | 61.0 | 38.6 |
| 10 | 90.0 | 97.1 | 97.1 | 82.9 | 61.9 | 42.9 |
| 20 | 85.5 | 95.0 | 94.0 | 85.0 | 63.0 | 37.0 |
| 30 | 84.3 | 97.1 | 95.2 | 77.1 | 54.3 | 41.0 |
| 40 | 80.0 | 94.3 | 90.5 | 66.7 | 47.6 | 35.2 |
| 50 | 80.5 | 90.5 | 83.8 | 63.8 | 50.5 | 38.1 |

EXAMPLE 5

Oxygen Shutting-Off Test

In order to evaluate the ability to supply lattice oxygen of the NMO+V/TiO$_2$ catalyst of the present invention and the conventional V/TiO$_2$ catalyst, the oxygen shutting-off test was conducted. The results are given in FIG. 6. Immediately after shutting-off the supply of oxygen, the nitrogen oxides removal efficiency is drastically decreased. However, such removal efficiency does not continuously decrease but is maintained for a predetermined time period and then decreases again. This is believed to be because the SCR reaction proceeds with the consumption of the lattice oxygen of the catalyst.

Figure 6:
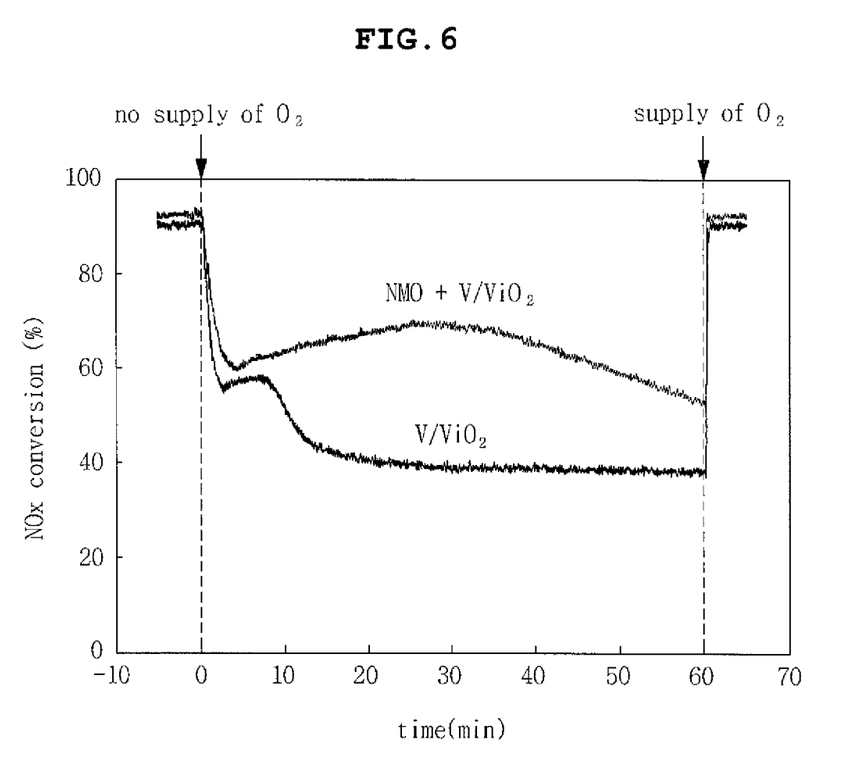
FIG. 6 is a graph showing the results of an oxygen shutting-off test for the $NMO+V/TiO_2$ catalyst and the $V/TiO_2$ catalyst.

As shown in FIG. 6, the NMO+V/TiO$_2$ catalyst can maintain the activity thereof for a longer period of time than can the V/TiO$_2$ catalyst, thanks to the high ability to supply the lattice oxygen thereof. Accordingly, the SCR may more efficiently proceed through oxidation and/or reduction using the lattice oxygen. The above test was conducted at a low temperature of 200° C. At a high temperature, there is no particular difference in ability between the two catalysts. Therefore, the reason why the nitrogen oxides removal efficiency of the catalyst of the present invention is higher at a low temperature is that the ability to supply the lattice oxygen thereof is excellent.

EXAMPLE 6

Catalyst Re-Oxidation Test

Figure 7:
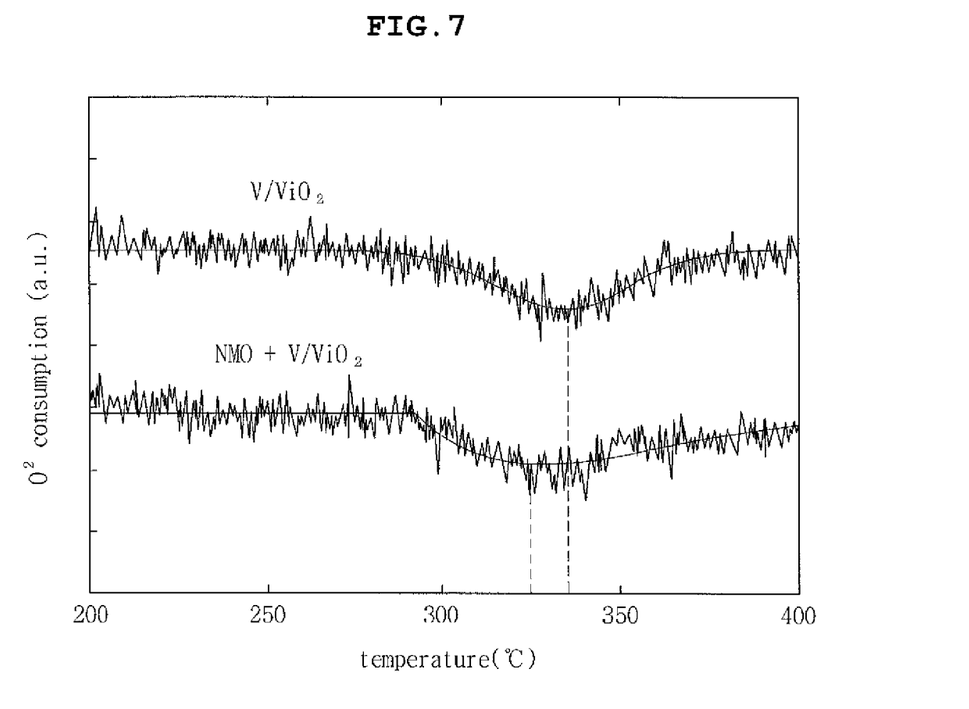
FIG. 7 is a graph showing the results of a catalyst re-oxidation test for the $NMO+V/TiO_2$ catalyst and the $V/TiO_2$ catalyst.

In order to evaluate the oxidation power of the NMO+V/TiO$_2$ catalyst of the present invention and the conventional V/TiO$_2$ catalyst, a re-oxidation test was conducted. The results are shown in FIG. 7. The test was carried out in such a manner that oxygen was supplied to the reduced catalyst, and the temperature required for the consumption of oxygen upon an increase in temperature was measured. In the conventional V/TiO$_2$ catalyst, oxygen is consumed at about 335° C., while the NMO+V/TiO$_2$ catalyst of the present invention consumes oxygen at about 325° C., which is about 10° C. lower than the temperature when using the conventional catalyst. Hence, the catalyst of the present invention has excellent ability to supply lattice oxygen in Example 5, and also high re-oxidation capability due to gaseous oxygen and thus has superior oxidation and/or reduction to the conventional catalyst. Ultimately, through the above tests, the catalyst of the present invention is confirmed to have higher activities not only at high temperatures but also at low temperatures.

In addition, it is noted that the NMO+V/TiO$_2$ catalyst of the present invention is not a simple catalyst mixture. If the two materials are simply mixed, re-oxidation of oxygen is expected to take place in the specific regions of NMO and V/TiO$_2$. That is, if the NMO+V/TiO$_2$ catalyst is a simple mixture, although oxygen is consumed at about 335° C., such a phenomenon is not observed in FIG. 7. This means that the NMO+V/TiO$_2$ catalyst of the present invention is a novel compound in which respective constituent materials are newly combined through a chemical reaction. That is, the catalyst of the present invention, prepared by subjecting NMO and V/TiO$_2$ to wet mixing, drying and then calcining to cause a chemical reaction on the surfaces of two materials so as to form a novel structure, is regarded not as a simple mixture of two materials but as a novel catalyst material.

EXAMPLE 7

Ammonium Nitrate Decomposition Performance

The decomposition of ammonium nitrate deposited on the catalyst and the temperature required for initiating the decomposition may directly affect the activity of the SCR catalyst and durability in the low temperature range. Hence, the catalyst essentially requires the decomposition of a salt thereon. Accordingly, poisoning resistance was evaluated through the ammonium nitrate decomposition test of the catalyst of the present invention.

In order to measure the decomposition temperature of ammonium nitrate, capable of inactivating the catalyst in the low temperature range, 1 g of ammonium nitrate was artificially supported on 10 g of the NMO+V/TiO$_2$ catalyst of the present invention and then dried. 0.1 g of the catalyst was heated to 300° C. at a rate of 10° C./min without changing the desorption peak while supplying 3% oxygen at a flow rate of 50 ml/min at 110° C., and the decomposition of ammonium nitrate was observed. The results are shown in FIG. 8.

Figure 8:
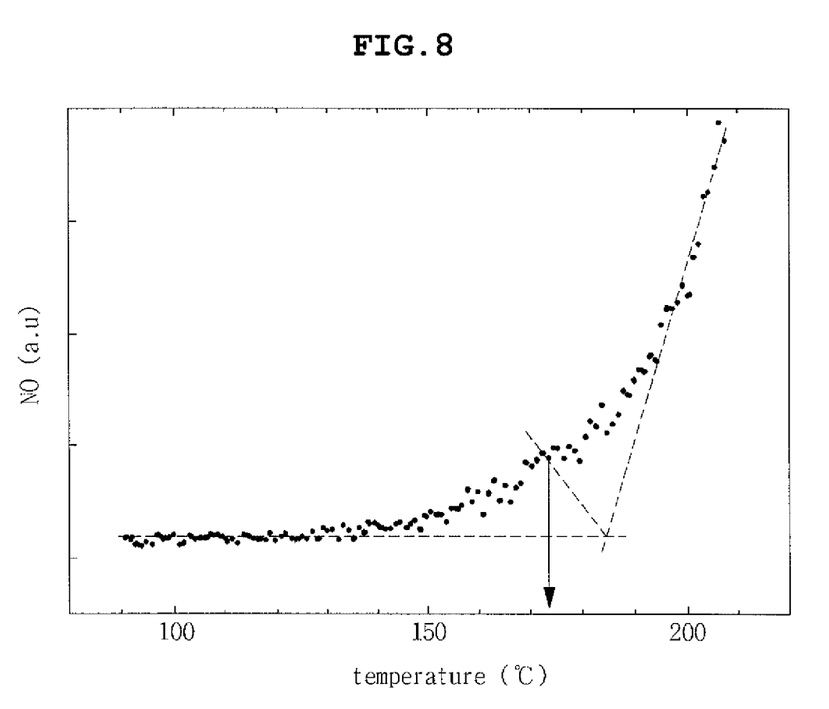
FIG. 8 is a graph showing the results of detection of the amount of nitrogen monoxide decomposed through TPO (Temperature Programmed Program) depending on temperature, in order to deduce the decomposition property of ammonium nitrate on the $NMO+V/TiO_2$ catalyst of the present invention, the NMO, and the $V/TiO_2$ catalyst.

As shown in FIG. 8, the NMO+V/TiO$_2$ catalyst begins to decompose ammonium nitrate at about 173° C. Thus, it is possible to decompose ammonium nitrate using the mixed catalyst of the present invention in a low operating temperature range of 180° C. or less, thus preventing the poisoning of the catalyst, resulting in inhibition of the inactivation of the catalyst in the low temperature and also assuring the active site of the catalyst.

EXAMPLE 8

Dioxin Removal Performance

In order to evaluate the removal performance of dioxin contained in the flue gas using the catalyst of the present invention, 1,2-DCB (dichlorobenzene), having a structure similar to dioxin and being useful as a material for the decomposition of dioxin, was used. Three tests, including the same SCR test as Example 3 (SCR test), a test for inducing removal of both nitrogen oxides and 1,2-DCB through simultaneous addition (SCR+Dioxin test), and a test for evaluating the decomposition performance through the addition of only 1,2-DCB (Dioxin test), were conducted.

The SCR test was carried out using 800 ppm $NO_x$, 3% oxygen, $NH_3/NO_x$ of 1.0, and an amount of catalyst based on GHSV of 10,000 $hr^{-1}$. The SCR+Dioxin test was the same as the SCR test, with the exception of the addition of 300 ppm 1,2-DCB. The Dioxin test was performed using only 300 ppm 1,2-DCB and 3% oxygen. As such, the GHSV was set to 10,000 $hr^{-1}$.

Figure 9:
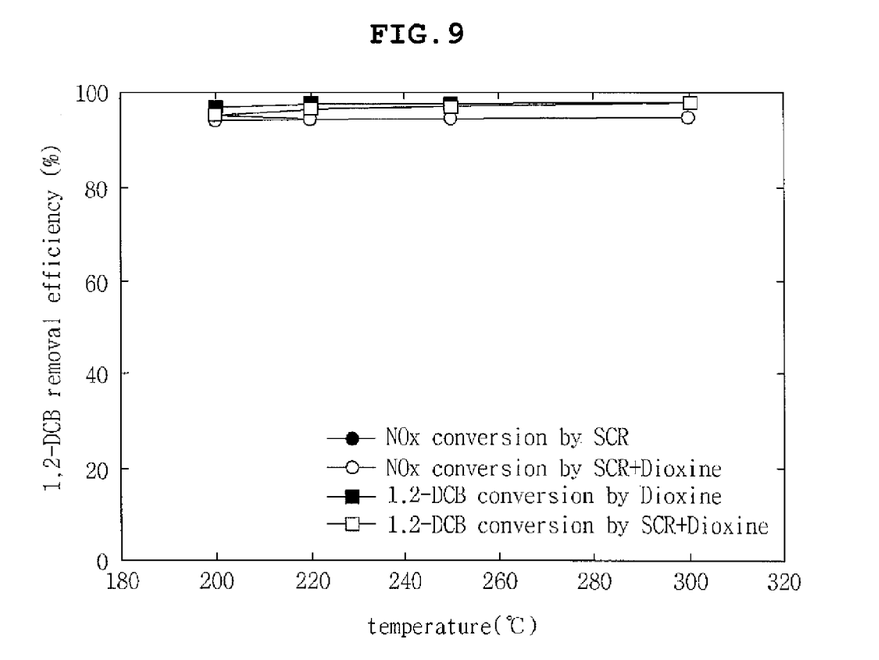
FIG. 9 is a graph showing the performance of the $NMO+V/TiO_2$ catalyst of the present invention on the removal of dioxin and/or nitrogen oxides.

FIG. 9 is a graph showing the nitrogen oxides removal performance upon the SCR test and the SCR+Dioxin test. Further, upon the SCR+Dioxin test and the Dioxin test, the removal performance of 1,2-DCB is depicted together. As shown in FIG. 9, there is no difference in nitrogen oxides removal performance, even with the use of 1,2-DCB. In addition, even though the SCR reaction progresses together, the removal performance of 1,2-DCB makes little difference. This is because the active site of the vanadium/titania catalyst is V—O—Ti for oxidation of 1,2-DCB and also is V=O and V—OH for the SCR reaction. Furthermore, under given conditions, the removal efficiency of 1,2-DCB is 90% or higher. Thus, when the mixed catalyst of the present invention is used, dioxin in the flue gas does not affect the nitrogen oxides removal reaction, and furthermore, may be removed at the time of the SCR reaction.

INDUSTRIAL APPLICABILITY

As described above, the present invention provides a catalyst prepared by mixing NMO with a $V/TiO_2$ denitrification catalyst, and a method of using the same. According to the present invention, NMO, having high nitrogen oxides removal properties at low temperatures, is mixed with the $V/TiO_2$ catalyst, having high nitrogen oxides removal activity at high temperatures, such that a novel catalyst, having activity of removing nitrogen oxides and dioxin greater than when the above respective catalysts are used separately, can be obtained. Therefore, the catalyst of the present invention may be used in the field of a high-temperature application to which a conventional denitrification system has been applied, and also may be applied to the low temperature range where a conventional denitrification catalyst has been impossible to apply.

During conventional flue gas disposal processes, since the temperature of the flue gas is low in the rear of the dust collector and/or desulfurization system, the conventional denitrification catalyst is impossible to apply. However, the NMO+V/$TiO_2$ catalyst of the present invention can be operated even at low temperatures of 250° C. or less, and hence may be used in the conventional flue gas disposal system. In addition, when a conventional denitrification catalyst is applied to the rear of a wet desulfurization system, a re-heating process is required to form a high-temperature condition. However, in the case of using the catalyst of the present invention, it can exhibit performance equal to or higher than the conventional catalyst, at a temperature lower than a conventionally used temperature. Thereby, energy used for the re-heating process may be decreased.

That is, when the SCR system using the NMO+V/$TiO_2$ catalyst of the present invention is applied to the conventional flue gas disposal process, the application position of the catalyst is less limited, and thus the space may be effectively used. Accordingly, the cost is decreased without the need for a novel system. Further, the catalyst of the present invention may be used in a smaller amount thanks to the high activity at low temperatures, resulting in decreased system costs and lowered pressure loss of the catalyst bed.

Conventionally, since NMO is decreased with respect to its activity in the high temperature range, a high-temperature catalyst is required in the high temperature range. Further, in the operation of a system for the emission of nitrogen oxides and dioxin, change in the operation thereof and stoppage of the operation thereof take place at temperatures lower than a steady state. Thus, the use of the high-temperature catalyst results in drastically decreased removal efficiencies of nitrogen oxides and dioxin. However, the use of the catalyst of the present invention can overcome the above problems.

According to Reaction 1, nitrogen monoxide and ammonia, serving as a reducing agent, are supplied at a molar ratio of 1:1. When nitrogen monoxide and ammonia are supplied in a stoichiometric ratio, that the nitrogen oxides are not completely removed but are discharged indicates the emission of unreacted ammonia at the same ratio. Further, unreacted ammonia itself is poisonous and is formed into ammonium sulfate according to Reactions 6 and 7. Ultimately, the inhibition of unreacted ammonia is regarded as very important because it is directly concerned with the lifetime and activity of the catalyst. As mentioned above, the NMO+V/$TiO_2$ catalyst of the present invention has high activity even at low temperatures, and hence it functions to further reduce the emission of nitrogen oxides and unreacted ammonia, compared to conventional denitrification catalysts, leading to prevention of the formation of ammonium sulfate. Generally, in order to decrease the amount of unreacted ammonia, ammonia is supplied at a ratio of 0.5~0.8 relative to nitrogen oxides upon actual operation. Particularly, at low temperatures, as ammonia is added in a decreased amount, nitrogen oxides removal efficiency is lowered. Thus, ammonia should be added at an optimal ratio in consideration of the unreacted ammonia emission. Therefore, the NMO+V/$TiO_2$ catalyst of the present invention has high activity at low temperatures, thus maximizing the amount of ammonia, thereby exhibiting high nitrogen oxides removal performance.

The NMO+V/$TiO_2$ catalyst of the present invention can decompose ammonium nitrate formed on the surface thereof at low temperatures, and hence can prevent the inactivation thereof at low temperatures.

Moreover, the NMO+V/$TiO_2$ catalyst can function to remove dioxin, as well as nitrogen oxides, contained in flue gas, due to the high low-temperature activity thereof. That is, it is possible to simultaneously remove nitrogen oxides and dioxin because the reaction progresses at the active site for the removal of dioxin, rather than the active sites for the removal of nitrogen oxides. Thus, there is no need for an additional dioxin disposal device, decreasing the device cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for removing nitrogen oxides, dioxin or a mixture thereof contained in flue gas, which is conducted at 150-400° C. at a gas hourly space velocity of 1,000-60,000 $hr^{-1}$ in the presence of a catalyst comprising:
    (i) vanadium supported on titania, the vanadium being supported in an amount of 0.5-10 wt %, based on the element, of titania; and
    (ii) 5-30 wt % natural manganese ore having pyrolusite, wherein the catalyst is prepared by a method comprising the following steps:
    a) drying and calcining natural manganese ore followed by making powders of the dried and calcined natural manganese ore;
    b) separately, wet impregnating titania in a solution of vanadium precursor, followed by drying and calcining to give the vanadium supported on titania; and
    c) wet mixing said dried and calcined natural manganese ore with said vanadium supported on titania using ball milling, followed by drying and calcining, and
    wherein nitrogen oxides are removed by selective catalytic reduction, while dioxin is removed by oxidation, and
    wherein the natural manganese ore further comprises Si, Al, Fe, Ca and Mg in the form of oxide in addition to manganese oxide.

2. The method according to claim 1, wherein the step b) further comprises supporting the titania with tungsten oxides prior to or simultaneously with the step of wet impregnating, the amount of tungsten oxides being in an amount of up to 15 wt % based on the weight of the titania.

3. The method according to claim 2, wherein the amount of tungsten oxides is in an amount of 5-10 wt % based on the weight of the titania.

4. The method according to claim 1, wherein the vanadium precursor is ammonium metavanadate or vanadium chloride.

5. The method according to claim 1, wherein the catalyst is applied on a structure selected from the group consisting of a metal plate, a metal fiber, a ceramic filter, and a honeycomb structure.

6. The method according to claim 1, wherein the catalyst is applied on at least one member selected from the group consisting of an air preheater, a tube group, a duct, and a wall of a boiler.

7. The method according to claim 1, wherein the catalyst is in an extruded form that is a particle or a monolith.

8. The method according to claim 5, wherein the catalyst has a particle size of 1-10 μm.

9. The method according to claim 6, wherein the catalyst has a particle size of 1-10 μm.

10. The method according to claim 1, wherein ammonia, which is a reducing agent, is supplied at a molar ratio of $NH_3/NO_x$ of 0.6-1.2 upon the selective catalytic reduction of the nitrogen oxides.

11. The method according to claim 1, wherein the flue gas contains a mixture of nitrogen oxides and dioxin, and the nitrogen oxides and the dioxin are removed simultaneously.

12. The method according to claim 11, wherein the flue gas contains the dioxin up to 500 ppm.

13. The method according to claim 12, wherein a removal efficiency of the dioxin is 90% or higher.

14. The method according to claim 1, wherein the calcining in step c) is conducted at a temperature of 100-500° C.

* * * * *